(12) United States Patent
Baek

(10) Patent No.: US 7,753,453 B2
(45) Date of Patent: Jul. 13, 2010

(54) WHEEL BALANCE WEIGHT FOR AUTOMOBILE TIRE

(75) Inventor: Pal Sung Baek, Gyeonggi-do (KR)

(73) Assignee: Donghwa Tech Co., Incheon (KR)

( * ) Notice: Subject to any disclaimer, the term of this patent is extended or adjusted under 35 U.S.C. 154(b) by 0 days.

(21) Appl. No.: 12/071,957

(22) Filed: Feb. 28, 2008

(65) Prior Publication Data

US 2008/0217988 A1    Sep. 11, 2008

Related U.S. Application Data

(63) Continuation-in-part of application No. 11/635,427, filed on Dec. 7, 2006, now abandoned.

(30) Foreign Application Priority Data

Feb. 26, 2008   (KR) ...................... 10-2008-0017153

(51) Int. Cl.
*B60B 27/00* (2006.01)
(52) U.S. Cl. ..................................... 301/5.21
(58) Field of Classification Search ................ 301/5.21, 301/5.22; 295/6
See application file for complete search history.

(56) References Cited

U.S. PATENT DOCUMENTS

| | | | | | |
|---|---|---|---|---|---|
| 2,137,415 A | * | 11/1938 | Rubsam | ...................... | 301/5.21 |
| 2,137,416 A | * | 11/1938 | Rubsam | ...................... | 301/5.21 |
| 2,197,422 A | * | 4/1940 | Wright | ...................... | 301/5.21 |
| 2,202,129 A | * | 5/1940 | Turner | ...................... | 301/5.21 |
| 2,329,854 A | * | 9/1943 | Rubsam | ...................... | 301/5.21 |
| 2,359,248 A | * | 9/1944 | Rubsam | ...................... | 301/5.21 |
| 2,485,936 A | * | 10/1949 | Stroberg | ...................... | 301/5.21 |
| 2,926,955 A | * | 3/1960 | Lyon | ...................... | 301/5.21 |
| 3,056,631 A | * | 10/1962 | Mills | ...................... | 301/5.21 |
| 4,728,154 A | * | 3/1988 | Boyle et al. | ................ | 301/5.21 |
| 6,238,006 B1 | * | 5/2001 | Manojlovic | ................ | 301/5.21 |

* cited by examiner

*Primary Examiner*—Jason R Bellinger
(74) *Attorney, Agent, or Firm*—Lowe Hauptman Ham & Berner, LLP

(57) ABSTRACT

A wheel balance weight for an automobile is provided. The wheel balance weight for an automobile includes a weight holder 10 having a hook part 12 press-fitted between a rim 7 of an automobile wheel 5 and a tire bead part 9 and an arcuate gripping part 14 provided at the other end of the hook part 12, and a weight element 20 detachably gripped by an inner periphery of the gripping part 14 of the weight holder 10, wherein the gripping part 14 of the weight holder 10 has a cut-out part 14*a* formed at a center part thereof to a certain length in a circumferential direction thereof, and the weight element 20 has a fixing protrusion 22 projecting from an outer periphery thereof through the cut-out part 14*a* of the gripping part 14 to the exterior and fixedly hooked by the gripping part 14.

3 Claims, 5 Drawing Sheets

WHEEL BALANCE WEIGHT FOR AUTOMOBILE TIRE

This application is being filed as a continuation-in-part of Ser. No. 11/635,427, which was filed on Dec. 7, 2006 now abandoned.

FIELD OF THE INVENTION

The present invention relates to a wheel balance weight for an automobile, and more particularly, to a wheel balance weight for an automobile, which includes a weight holder press-fitted onto a rim of a wheel and a weight element fixedly inserted into the weight holder, capable of primarily preventing the weight element from being separated from the weight holder in an axial direction thereof due to external factors such as vibrations and eccentric loads of a rapidly rotating tire, and secondarily preventing the weight holder from being separated from the rim or the weight element from being rotated in a gripping part in a rotational direction thereof.

BACKGROUND OF THE INVENTION

In general, an automobile tire is manufactured by a vulcanization process using a predetermined mold. In the process of forming a tire, it is likely to be out of weight balance of the tire, i.e., there inevitably occurs irregular distribution of the tire weight.

Such weight imbalance of the tire causes chassis vibrations during its rapid rotation to decrease automobile ride comfort. Moreover, when the vibration is too excessive or continuously generated for an extended period of time, fatigue is continuously applied to the chassis, and therefore, gaps or cracks occur between or from various parts to reduce lifespan and lower steering stability of the automobile, thereby increasing the risk of being involved in a car accident.

In order to solve the above problems, there was proposed a wheel balance weight having an appropriate weight and installed at a symmetrical point where weight imbalance of the tire is compensated to uniformly maintain weight distribution of the tire.

More specifically, an automobile tire in a tubeless shape is installed around a wheel coupled with an axle and filled with the air. At this time, a wheel balance weight may be installed at an appropriate position between a tire bead part and a rim of the wheel, to thereby compensate imbalance of the tire weight.

The wheel balance weight is generally formed of lead having a relatively large specific gravity. However, such a wheel balance weight formed of lead may cause environmental contamination problems. For this reason, the balance weight distributed in recent years is manufactured by using soft steel and so on.

In the above process, the conventional wheel balance weight is mainly mounted in a clip or adhesive manner using a double-sided tape. For example, in case of using a clip type balance weight, the balance weight is coupled to an appropriate position between the tire bead part and the rim of the wheel in a press-fit manner.

Specifically, the clip type balance weight has a weight holder provided with a hook part that has a "C" shaped end part press-fitted onto the rim of a wheel, and a weight element attached to a gripping part formed at the other end part of the weight holder for counterbalancing the weight imbalance of the tire.

In this structure, the weight element may be riveted or gripped on the gripping part.

However, when the weight element and the gripping part are riveted together, the number of processes required increases and the entire coupling between them is not stable enough. In addition, defects frequently occur during the riveting process and the weight element may be separated from the gripping part of the weight holder in use, thereby lowering reliability of the product.

Moreover, when the weight element is gripped by the gripping part of the weight holder, the weight element is fixedly inserted into the gripping part, which is formed by bending a lower end of the weight holder to a certain length in an arc shape through a predetermined bending process. In this case, since there is no means for fixing the weight element in the gripping part, the weight element may be readily moved in an axial direction thereof due to vibrations during rapid rotation of the tire or may even be separated from the gripping part.

Furthermore, there is no means for suppressing relative movement between the hook part and the gripping part of the weight holder, and the rim and the weight element corresponding thereto. For this reason, the weight holder may be separated from the rim due to vibrations during rapid rotation of the tire or the weight element may be rotated in the gripping part in a rotational direction thereof.

SUMMARY OF THE INVENTION

Therefore, the present invention has been made in view of the above problems of the prior arts, and it is a primary object of the present invention to provide a wheel balance weight for an automobile, which includes a weight holder press-fitted onto a rim of a wheel and a weight element fixedly inserted into the weight holder, capable of primarily preventing the weight element from being separated from the weight holder in an axial direction thereof due to external factors such as vibrations and eccentric loads of a rapidly rotating tire, and secondarily preventing the weight holder from being separated from the rim or the weight element from being rotated in a gripping part in a rotational direction thereof.

In accordance with one aspect of the present invention to accomplish the above object, there is provided a wheel balance weight for an automobile, comprising: a weight holder having a hook part press-fitted between a rim of an automobile wheel and a tire bead part and an arcuate gripping part provided at the other end of the hook part; and a weight element detachably gripped by an inner periphery of the gripping part of the weight holder, wherein the gripping part of the weight holder has a cut-out part formed at a center part thereof to a certain length in a circumferential direction thereof, and the weight element has a fixing protrusion projecting from an outer periphery thereof through the cut-out part of the gripping part to the exterior and fixedly hooked by the gripping part.

In accordance with another aspect of the present invention, there is provided a wheel balance weight for an automobile, comprising: a weight holder having a hook part press-fitted between a rim of an automobile wheel and a tire bead part and an arcuate gripping part provided at the other end of the hook part; and a weight element detachably gripped by an inner periphery of the gripping part of the weight holder, wherein the weight element, covered by the gripping part of the weight holder, has a small diameter part formed at a center part of an outer periphery thereof to form steps at both side ends of the small diameter part.

BRIEF DESCRIPTION OF THE DRAWINGS

The above and other objects and features of the instant invention will become apparent from the following description of exemplary embodiments taken in conjunction with the accompanying drawings, in which.

DETAILED DESCRIPTION OF THE INVENTION

Hereinafter, an exemplary embodiment of the present invention will be described in more detail with reference to the accompanying drawings.

Figure 1:
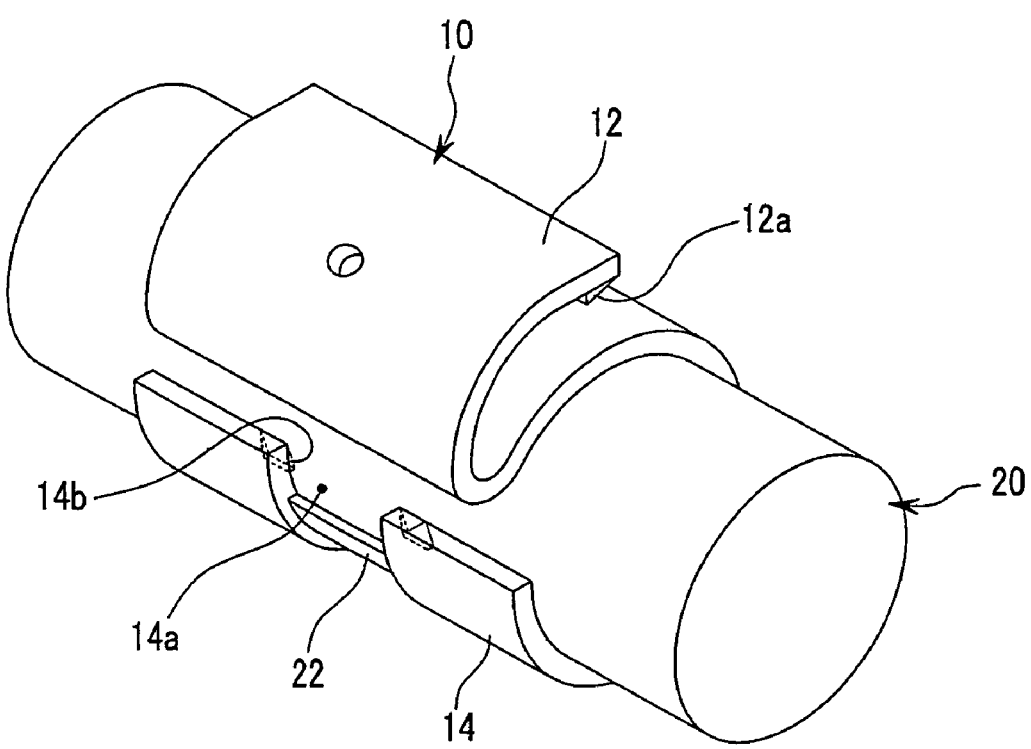
FIG. 1 is a perspective view showing a wheel balance weight for an automobile in accordance with an exemplary embodiment of the present invention.
Figure 2:
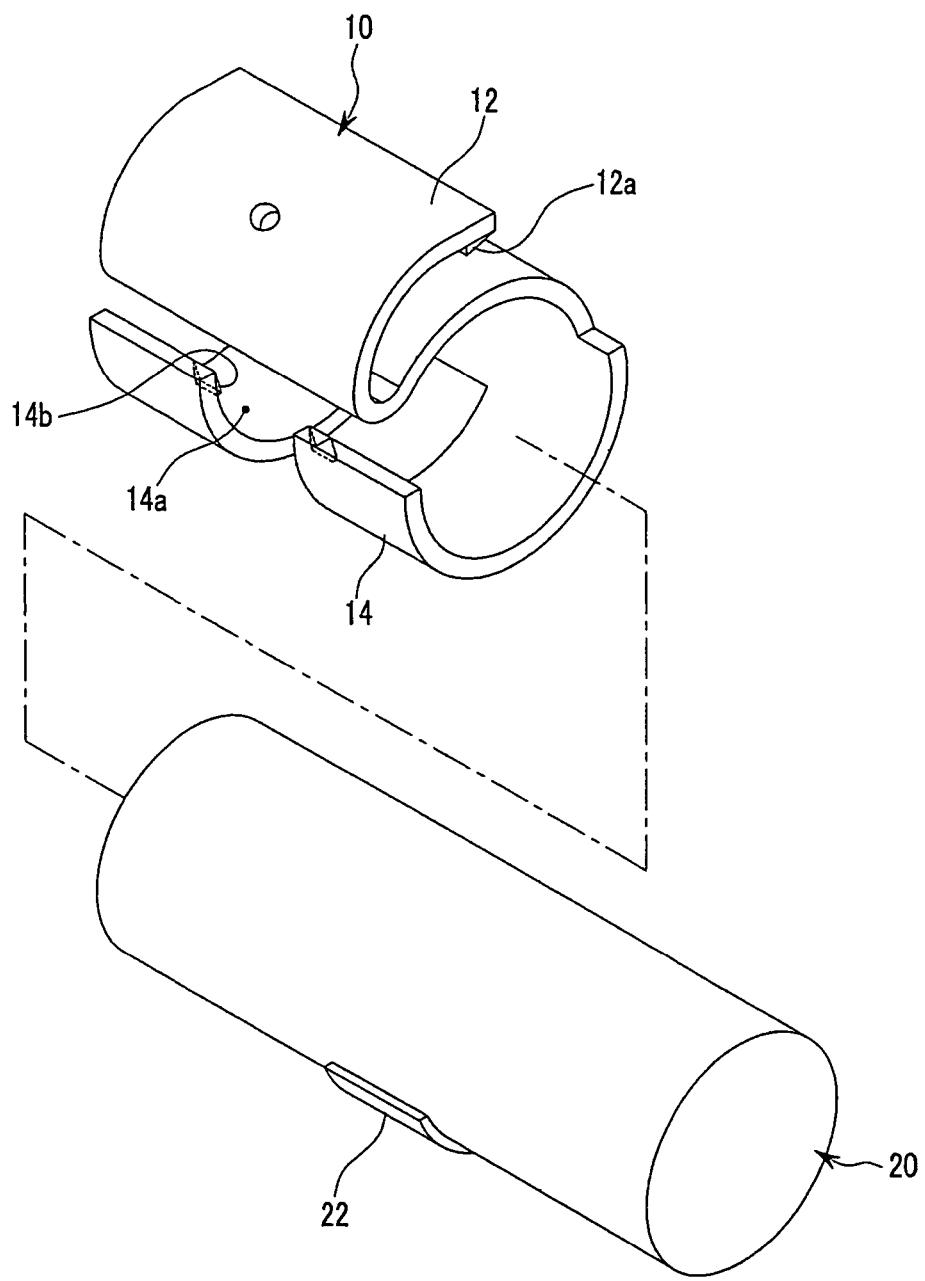
FIG. 2 is an exploded perspective view showing a wheel balance weight for an automobile in accordance with an exemplary embodiment of the present invention.
Figure 3:
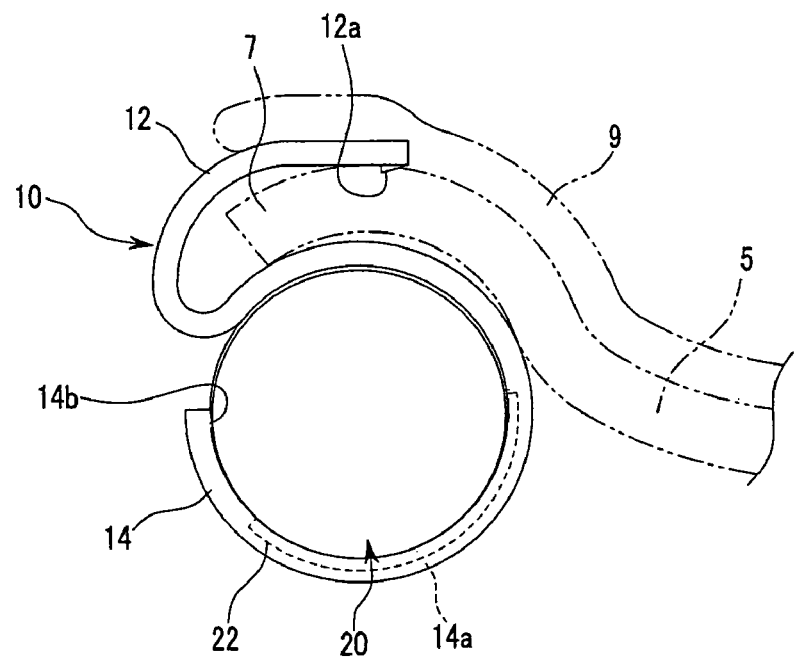
FIG. 3 is a schematic side view showing a wheel balance weight for an automobile in accordance with an exemplary embodiment of the present invention, which is mounted on a wheel.

As shown in FIGS. 1 to 3, a wheel balance weight for an automobile in accordance with an exemplary embodiment of the present invention includes a weight holder 10 having a hook part 12 press-fitted between a rim 7 of an automobile wheel 5 and a tire bead part 9 and a gripping part 14 provided at the other end of the hook part 12, and a weight element 20 gripped by the gripping part 14 of the weight holder 10.

The weight holder 10 is formed of an integrated and curved plate, in which the hook part 12 at one end is continuously formed with the gripping part 14 at the other end thereof to form a substantially "S" shape.

In addition, the gripping part 14 of the weight holder 10 has a cut-out part 14a formed at a center part thereof to a certain length in a circumferential direction thereof such that a fixing protrusion 22 of the weight element 20 is hooked by and fixed to the cut-out part 14a.

That is, the gripping part 14 is formed of a pair of curved plates having an arc shape and spaced a predetermined distance, i.e., a space for the cut-out part 14a, from each other.

In addition, the hook part 12 and the gripping part 14 of the weight holder 10 have hook projections 12a and 14b projecting from corners of the parts 12 and 14 such that the hook projections 12a and 14b are hooked by surfaces of the rim 7 and the weight element 20 to prevent separation from each other.

The hook projections 12a and 14b may have various shapes, for example, an arrow head shape, and so on, and may be disposed at various positions selected by a user, to more securely hook the rim 7 and the weight element 20.

Here, the gripping part 14 may be preferably formed of a resilient material to be resiliently widened for gripping the weight element 20.

The weight element 20 has a slightly curved bar member inserted into the gripping part 14 of the weight holder 10 and both ends of which are bent to a predetermined angle. The weight element 20 is provided with the fixing protrusion 22 projecting from a center of an outer periphery thereof through the cut-out part 14a of the gripping part 14 to the exterior, thereby being hooked and fixed between the curved plates of the gripping part 14.

Here, the fixing protrusion 22 of the weight element 20 has an axial length corresponding to the width of the cut-out part 14a of the gripping part 14, and an arc length within a range of the gripping part 14 in a rotational direction thereof.

In addition, the weight element 20 may have an arcuate structure to be more stably fixed to the gripping part 14, or may have a straight structure under the condition that the weight element 20 can be securely fixed using the fixing protrusion 22 only.

In the wheel balance weight for an automobile in accordance with an exemplary embodiment of the present invention having the constitution set forth above, the hook part 12 of the weight holder 10 is press-fitted between the rim 7 of the wheel 5 and the tirebead part 9 adjacent to the rim 5. In addition, the fixing protrusion 22 of the weight element 20 projects through the cut-out part 14a of the gripping part 14 to the exterior. As a result, the fixing protrusion 22 is securely fixed between the curved plates of the gripping part 14 to fix the weight element 20 in the gripping part 14, thereby completing installation of the wheel balance weight.

In the wheel balance weight for an automobile installed in this way, first, since the fixing protrusion 22 of the weight element 20 is securely fixed between the curved plates of the gripping part 14, it is possible to prevent the weight element 20 from being moved in an axial direction thereof or separated from the gripping part 14. In addition, since the hook projections 12a of the hook part 12 are closely pressed to the surface of the rim 7 to prevent separation thereof, and at the same time, the hook projections 14b of the grip art 14 are closely pressed to the outer surface of the weight element 20 to prevent rotation of the weight element 20 in its rotational direction.

Figure 4:
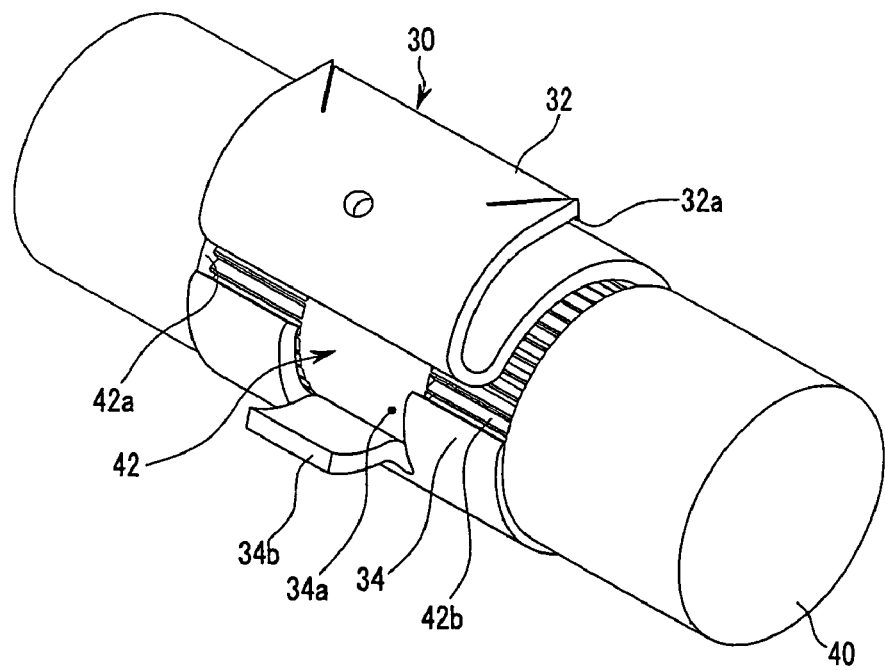
FIG. 4 is a perspective view showing a wheel balance weight for an automobile in accordance with another exemplary embodiment of the present invention.
Figure 5:
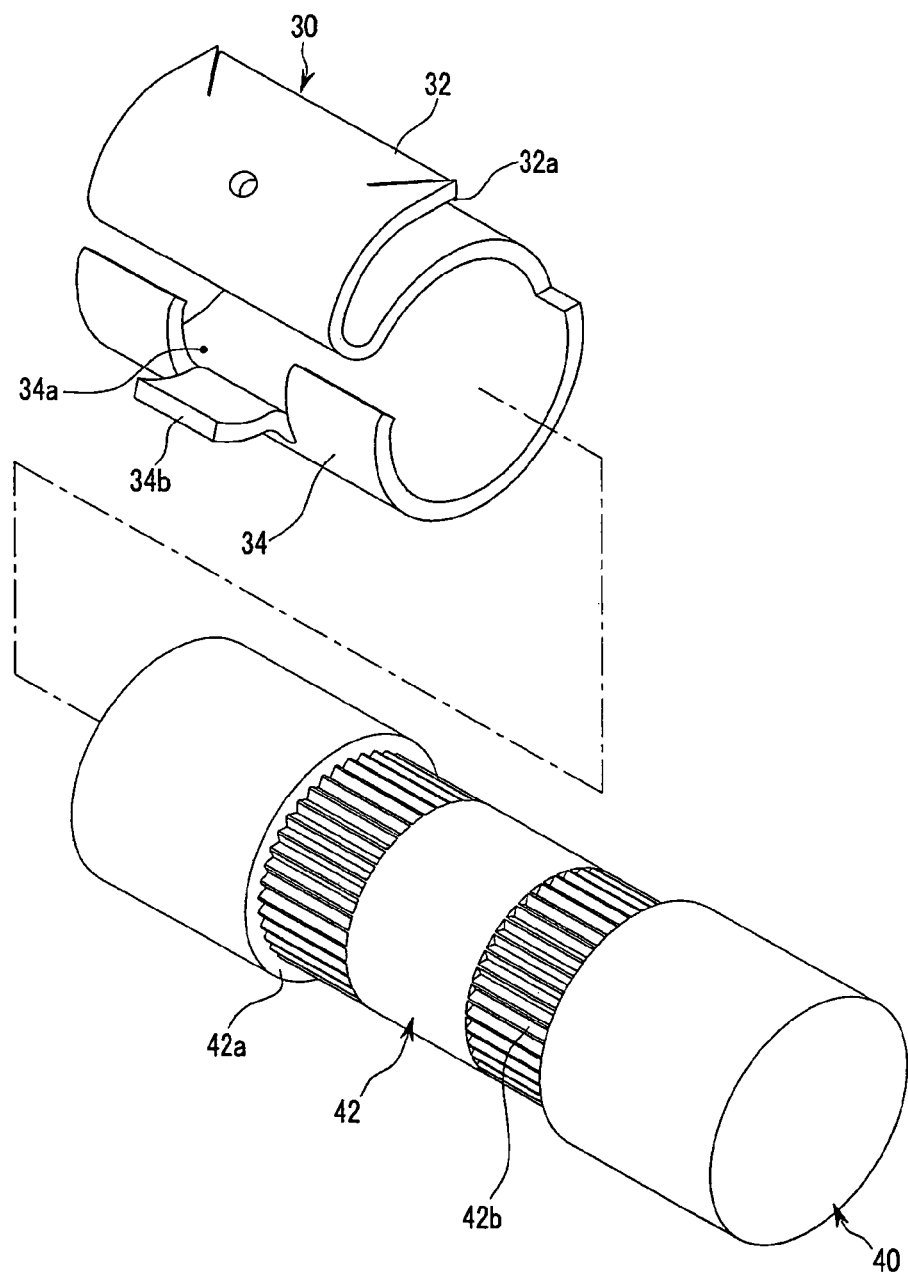
FIG. 5 is an exploded perspective view showing a wheel balance weight for an automobile in accordance with another exemplary embodiment of the present invention.
Figure 6:
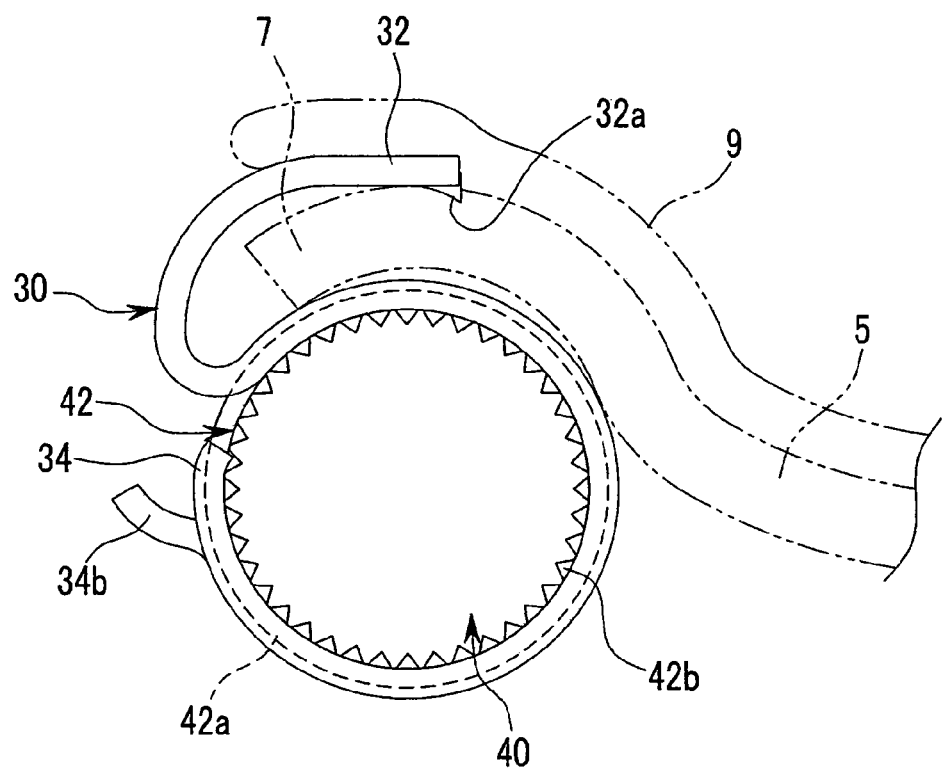
FIG. 6 is a schematic side view showing a wheel balance weight for an automobile in accordance with another exemplary embodiment of the present invention, which is mounted on a wheel.

Meanwhile, FIGS. 4 to 6 show a wheel balance weight for an automobile in accordance with another exemplary embodiment of the present invention, the entire configuration of the this embodiment is substantially the same as the embodiment shown in FIGS. 1 to 3, except other specific parts, which will be described below.

That is, basic components including a weight holder 30 having a hook part 32 press-fitted between a rim 7 of an automobile wheel 5 and a tire bead part 9 and a gripping part 34 provided at the other end of the hook part 32, and a weight element 40 gripped by the gripping part 34 of the weight holder 30 are the same as the embodiment of FIGS. 1 to 3.

However, in this embodiment, the weight element 40 has large diameter parts formed at both sides thereof, and a small diameter part 42 formed between the large diameter parts, to prevent separation of the weight element 40 in an axial direction of the gripping part 34. Therefore, when the gripping part 34 grips the small diameter part 42, both ends of the gripping part 34 are hooked by steps 42a of the small diameter part 42 to prevent axial movement of or separation of the weight element 40 from the gripping part 34 due to vibrations during rapid rotation of the tire.

In addition, hook means are formed at the hook part 32 and the gripping part 34 of the weight holder 30 to cause the hook part 32 to be hooked by the rim 7 and prevent movement of the weight element 40 gripped by the gripping part 34 in a rotational direction thereof. In order to increase resistance against the separation, both end corners of the hook part 32 are cut to a certain length in a diagonal direction thereof, and outer ends of the cut parts are bent inward to form hook projections 32a, which is to be hooked by the surface of the rim 7.

Further, the gripping part 34 has a cut-out part 34a formed by cutting two lines to a certain length in a circumferential direction thereof. As a result, a pair of curved plates are spaced a predetermined distance, i.e., a width of the cut-out part 34a, from each other. A plurality of hook grooves 42b are formed at an outer periphery of the small diameter part 42 of the weight element 40 along both sides thereof to hook the ends of the gripping part 34.

In addition, an opening tap 34b is formed at an outer center part of the gripping part 34, corresponding to the cut-out part 34a of the gripping part 34, to resiliently widen the gripping part 34, thereby assembling the weight element 40 to the gripping part 34.

Preferably, the gripping part 34 may also be formed of a resilient material to be resiliently widened to grip the weight element 40.

Further, the weight element 40 may have an arcuate structure to be more stably fixed to the gripping part 34, or may have a straight structure under the condition that the weight element 40 can be securely fixed using the small diameter part 42 only.

In the wheel balance weight for an automobile in accordance with another exemplary embodiment of the present invention having the constitution set forth above, the hook part 32 of the weight holder 30 is press-fitted between the rim 7 of the wheel 5 and the tire bead part 9 adjacent to the rim 5. The gripping part 34 is covered on the small diameter part 42. At this time, both side ends of the gripping part 34 are hooked by both steps 42a of the small diameter part 42 to securely fix the weight element 40 to the gripping part 34, thereby completing installation of the wheel balance weight.

In the wheel balance weight for an automobile installed in this way, first, since the small diameter part 42 of the weight element 40 is covered by the gripping part 34 to be securely fixed by the gripping part 34, it is possible to prevent the weight element 40 from being moved in an axial direction thereof or separated from the gripping part 34. In addition, the both ends of the gripping part 34 are hooked by the hooking grooves 42b formed at the outer periphery of the weight element 40 to prevent the weight element 40 from being moved in a rotational direction thereof. Further, since the hook projections 32a of the hook part 32 are closely pressed to the surface of the rim 7 to prevent separation thereof.

As described above, the wheel balance weight for an automobile of the present invention includes a weight holder press-fitted onto a rim of a wheel and a weight element fixedly inserted into the weight holder, and is capable of primarily preventing the weight element from being separated from the weight holder in an axial direction thereof due to external factors such as vibrations and eccentric loads of a rapidly rotating tire, and secondarily preventing the weight holder from being separated from the rim or the weight element from being rotated in a gripping part in a rotational direction thereof, thereby making stable wheel balance continuously maintained.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A wheel balance weight for an automobile, comprising:
   a weight holder (30) having a hooking part (32) press-fitted between a rim (7) of an automobile wheel (5) and a tire bead part (9) and an arcuate gripping part (34) provided at an end portion of the hook part (32); and
   a weight element (40) detachably gripped by an inner periphery of the gripping part (34) of the weight holder (30),
   wherein the weight element (40), covered by the gripping part (34) of the weight holder (30), has a coupling part (42) formed at a center part of an outer periphery of the weight element (40) to form steps (42a) at both side ends of the coupling part (42),
   wherein hook means are formed at the hook part (32) and the gripping part (34) of the weight holder (30),
   both end corners of the hook part (32) have hook projections (32a) which are cut to a length in a diagonal direction thereof, and outer ends of the cut parts are bent toward the wheel to be hooked by the surface of the rim (7) in order to increase resistance against separation,
   the gripping part (34) has a cut-out part (34a) formed at a center part by cutting two lines to a length along a circumference thereof, and
   a hook groove (42b) having teeth aligned with a longitudinal direction of the weight element is formed on surfaces of the coupling part (42) of the weight element (40) corresponding to the gripping part (34) so that the teeth engage with the gripping part (34).

2. The wheel balance weight for an automobile according to claim 1, wherein an opening tab (34b) is further formed at an outer center part of the gripping part (34), corresponding to the cut-out part (34a) of the gripping part (34) such that the opening tab (34b) is disposed between portions of the ripping part (34), to resiliently widen the gripping part (34).

3. The wheel balance weight for an automobile according to claim 1, wherein the gripping part (34) is formed of a resilient material to be resiliently widened to grip the weight element (40).

* * * * *